May 21, 1968   W. H. SCIDMORE ETAL   3,384,434
WIDE ANGLE EYEPIECE WITH LARGE EYE RELIEF
Filed April 2, 1965
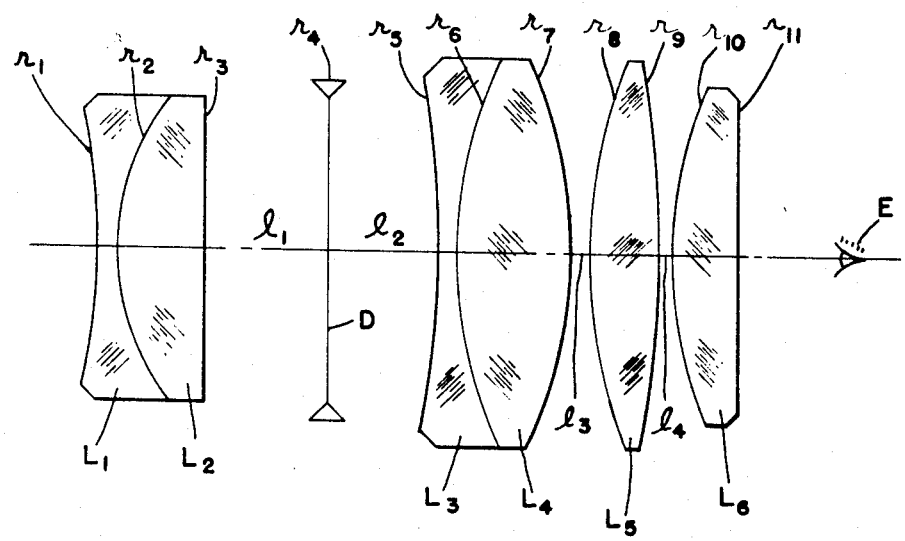
INVENTORS
WRIGHT H. SCIDMORE
MARY D. FLANAGAN 3,384,434
WIDE ANGLE EYEPIECE WITH
LARGE EYE RELIEF
Wright H. Scidmore, Langhorne, and Mary D. Flanagan, Philadelphia, Pa., assignors to the United States of America as represented by the Secretary of the Army
Filed Apr. 2, 1965, Ser. No. 445,287
1 Claim. (Cl. 350—208)

ABSTRACT OF THE DISCLOSURE

A filed stop or diaphragm is interposed between a pair of cemented doublet field lenses followed by a singlet center lens and a singlet eyelens to provide a wide angle eyepiece.

---

The invention described herein may be manufactured and used by or for the Government for governmental purposes without the payment to us of any royalty thereon.

This invention relates to eyepieces and more particularly concerns optical devices providing an exceptionally large field of view with a given magnification.

The use of wide angle eyepieces with large eye relief is desirable in various military vehicles, such as tanks, for example, wherein, for purposes of safety of the observer therein, gun recoil or the like may endanger the eyes or body of the observer due to inadequate clearance between the observer and the optical apparatus. It may also be necessary that the observer employ cumbersome devices such as gas masks and hence, sighting efficiency will greatly be improved by the use of our device.

It is therefore a principal object of this invention to provide an eyepiece substantially possessing the aforementioned advantages.

Other objects and advantages will become apparent from a consideration of the following specification and claims and the single figure of the drawing which illustrates a diagrammatic embodiment of our inventive device, in axial section.

Briefly, the present invention is based on the discovery that by judiciously disposing in axial relation a cemented doublet field lens, a field stop or diaphragm, another type cemented doublet field lens, a singlet center lens and a singlet eyelens, an efficient and compact wide angle eyepiece having large eye relief will be provided having especial value in military vehicles and the like.

More specifically and referring to the drawing, in considering our device from the direction from front to rear, or towards the direction of eye E, we have provided a cemented doublet field lens of negative power, $L_1$ and $L_2$, a field stop or diaphragm D, a cemented doublet field lens, $L_3$ and $L_4$, a singlet center lens, $L_5$ and a singlet eyelens, $L_6$.

The data for the aforementioned elements or components are based on a focal length, F, of our eyepiece to be 1.000 inch. The ratio of eye relief to focal length is approximately 1.175. Our device has been found to work admirably well up to apparent field coverages of about 72°. The clear apertures listed in the Lens Table below are based on a 64° apparent field, but, as is well known in the optical art, greater coverages can be achieved by appropriately adjusting thicknesses and apertures of the relative components. Since our eyepiece is normally used in a telescope having another real focal plane, stop or diaphragm D, may be made somewhat larger to cover the full field of view desired so as to eliminate transverse chromatic aberration at the edges of the stop or diaphragm.

The symbols in the table below denote the following:

TABLE I

L—the individual lens
r—the radius of curvature
d—axial thickness of lens
l—air space
n—refractive index
v—Abbe's number of the glass
F—total focal length
$f_{1,2}$—focal length of cemented doublet, $L_1$–$L_2$
$f_{3,4}$—focal length of cemented doublet, $L_3$–$L_4$
$f_5$—focal length of $L_5$
$f_6$—focal length of $L_6$
C.A.—clear aperture

TABLE II.—LENS TABLE DATA

| Element | Radii | Axial Thickness | Air Space Thickness | $n_d$ | $v$ | C.A. |
|---|---|---|---|---|---|---|
| $L_{1,2}$ | $r_1 = -3.050$ | $d_1 = .063$ | | $n_1 = 1.620$ | $v_1 = 60.3$ | C.A.$_1$=1.120 |
| | $r_2 = +.976$ | $d_2 = .283$ | | $n_2 = 1.720$ | $v_2 = 29.3$ | |
| | $r_3 = \pm\infty$ | | | | | C.A.$_2$=1.167 |
| D | $r_4 = \pm\infty$ | | $l_1 = .753$ | | | C.A.$_D$=1.230 |
| | | | $l_2 = .587$ | | | |
| $L_{3,4}$ | $r_5 = -3.134$ | $d_3 = .073$ | | $n_3 = 1.720$ | $v_3 = 29.3$ | C.A.$_3$=1.343 |
| | $r_6 = +1.580$ | $d_4 = .508$ | | $n_4 = 1.620$ | $v_4 = 60.3$ | |
| | $r_7 = -1.580$ | | | | | C.A.$_4$=1.505 |
| $L_5$ | $r_8 = +2.501$ | $d_5 = .295$ | $l_3 = .007$ | $n_5 = 1.620$ | $v_5 = 60.3$ | C.A.$_5$=1.513 ($r_8$) |
| | $r_9 = -5.885$ | | | | | C.A.$_5$=1.484 ($r_9$) |
| $L_6$ | $r_{10} = +1.475$ | $d_6 = .285$ | $l_4 = .007$ | $n_6 = 1.620$ | $v_6 = 60.3$ | C.A.$_6$=1.364 ($r_{10}$) |
| | $r_{11} = +13.165$ | | | | | C.A.$_6$=1.267 ($r_{11}$) |

Equivalent focal length, F=1.000″.
$f_{1\text{ and }2} = -10.000″$.
$f_{3\text{ and }4} = 7.208″$.
$f_5 = 2.870″$.
$f_6 = 2.654″$.

Lens $L_1$ is of the bi-concave type and is cemented to a convex-plano lens $L_2$, the plano surface of lens $L_2$ being toward the eye E and the combined doublet lens has a divergent effect upon the incident light. This negative doublet has a focal length, $f_{1,2}$, of approximately $-10.000F$ which is partially responsible for producing our effective large eye relief.

The remaining radius of lens $L_1$, or radius $r_2$, is 0.320 times the radius $r_1$ of lens $L_1$. The air space distance separating lens $L_2$ from the diaphragm D is 0.753 inch, the diaphragm being located at the paraxial focus to serve as a field stop and to eliminate undesirable stray light as is well known in the art. The field lens elements $L_3$ and $L_4$ is a cemented doublet comprising a bi-concave negative element $L_3$ and an equi-convex positive lens $L_4$ where the radii, $r_6$ and $r_7$ are equal. The focal length $f_{3,4}$ of the field lens $L_3$ and $L_4$ is approximately 7.208F. Center lens $L_5$ is a bi-convex singlet. The radius $r_8$ of lens $L_5$ is 0.425 of its other radius $r_9$ and the focal length of lens $L_5$ is 2.870F. Eyelens $L_4$ is a meniscus singlet and its long concave radius, $r_{11}$, is the surface closest to the eye and has a focal length approximating 2.654F. Radius $r_{10}$ of eyelens $L_6$ is approximately 0.112 times smaller than radius $r_{11}$.

The latter three components, i.e., cemented doublet lens $L_3$ and $L_4$, and singlets $L_5$ and $L_6$, all impart a converging effect on incident light. Lenses $L_4$, $L_5$ and $L_6$, having positive refracting powers, are placed close to the eye whereas the lenses of negative refracting powers are placed further from the eye. This aformentioned arrangement positions the principal plane outside the eyepiece towards the eye and is largely responsible for our inventive large ratio of eye relief or distance to focal length.

Lenses $L_1$, $L_4$, $L_5$, and $L_6$ are conveniently made from 620–603 glass whereas lenses $L_2$ and $L_3$ are preferably of 720–290 glass.

Our device has a Petzval curvature of 0.446, the Petzval radius being 2.243F.

We claim:

1. A wide angle eyepiece with large eye relief comprising, axially from front to rear,
   a cemented doublet field lens of negative power,
   a diaphragm,
   a cemented doublet field lens,
   a singlet center lens, and
   a singlet eye lens, said eyepiece conforming substantially to the following table in which dimensions are in terms of inches, and proceeding from front to rear, $L_1$ to $L_6$ designate the lenses of said eyepiece, $r_1$ to $r_{11}$ designate the radii of curvature of surfaces of said respective lenses and said diaphragm, $d_1$ to $d_6$ designate the axial thicknesses of said respective lenses, $l_1$ to $l_4$ designate the axial air space thicknesses between said respective elements, $n_1$ to $n_6$ designate the indices of refraction of said respective lenses, $v_1$ to $v_6$ designate the Abbe dispersion numbers of said respective lenses and $C.A._1$ to $C.A._6$ designates the clear apertures of the respective lenses and $C.A._D$ designates the clear aperture of said diaphragm:

TABLE II.—LENS TABLE DATA

| Element | Radii | Axial Thickness | Air Space Thickness | $n_1$ | $v$ | C.A. |
|---|---|---|---|---|---|---|
| $L_{1, 2}$ | $r_1 = -3.050$ | $d_1 = .063$ | | $n_1 = 1.620$ | $v_1 = 60.3$ | $C.A._1 = 1.120$ |
| | $r_2 = +.976$ | $d_2 = .283$ | | $n_2 = 1.720$ | $v_2 = 29.3$ | |
| | $r_3 = \pm \infty$ | $l_2 = .588$ | $l_1 = .753$ | | | $C.A._2 = 1.167$ |
| D | $r_4 = \pm \infty$ | | $l_2 = .587$ | | | $C.A._D = 1.230$ |
| $L_{3, 4}$ | $r_5 = -3.134$ | $d_3 = .073$ | | $n_3 = 1.720$ | $v_3 = 29.3$ | $C.A._3 = 1.343$ |
| | $r_6 = +1.580$ | $d_4 = .508$ | | $n_4 = 1.620$ | $v_4 = 60.3$ | |
| | $r_7 = -1.580$ | | $l_3 = .007$ | | | $C.A._4 = 1.505$ |
| $L_5$ | $r_8 = +2.501$ | $d_5 = .295$ | | $n_5 = 1.620$ | $v_5 = 60.3$ | $C.A._5 = 1.513$ ($r_8$) |
| | $r_9 = -5.885$ | | $l_4 = .007$ | | | $C.A._5 = 1.484$ ($r_9$) |
| $L_6$ | $r_{10} = +1.475$ | $d_6 = .285$ | | $n_6 = 1.620$ | $v_6 = 60.3$ | $C.A._6 = 1.364$ ($r_{10}$) |
| | $r_{11} = +13.165$ | | | | | $C.A._6 = 1.267$ ($r_{11}$) |

Equivalent focal length, $F = 1.000''$.
$f_{1 \text{ and } 2} = -10.000''$.
$f_{3 \text{ and } 4} = 7.208''$.
$f_5 = 2.870''$.
$f_6 = 2.654''$.

No references cited.

DAVID H. RUBIN, *Primary Examiner.*

R. J. STERN, *Assistant Examiner.*